United States Patent
Ai et al.

(10) Patent No.: US 12,164,195 B2
(45) Date of Patent: Dec. 10, 2024

(54) DISPLAY PANEL AND MANUFACTURING METHOD THEREOF, AND DISPLAY DEVICE

(71) Applicant: WUHAN CHINA STAR OPTOELECTRONICS TECHNOLOGY CO., LTD., Hubei (CN)

(72) Inventors: Fei Ai, Hubei (CN); Dewei Song, Hubei (CN); Chengzhi Luo, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 75 days.

(21) Appl. No.: 17/925,028

(22) PCT Filed: Nov. 8, 2022

(86) PCT No.: PCT/CN2022/130677
§ 371 (c)(1),
(2) Date: Nov. 14, 2022

(87) PCT Pub. No.: WO2024/040751
PCT Pub. Date: Feb. 29, 2024

(65) Prior Publication Data
US 2024/0069381 A1   Feb. 29, 2024

(30) Foreign Application Priority Data
Aug. 23, 2022  (CN) .......................... 202211012624.6

(51) Int. Cl.
*G02F 1/1335* (2006.01)
*G02F 1/1333* (2006.01)
*G02F 1/1368* (2006.01)

(52) U.S. Cl.
CPC .................. *G02F 1/133607* (2021.01); *G02F 1/133345* (2013.01); *G02F 1/133553* (2013.01); *G02F 1/1368* (2013.01)

(58) Field of Classification Search
CPC ......... G02F 1/133345; G02F 1/133553; G02F 1/133555
See application file for complete search history.

(56) References Cited

U.S. PATENT DOCUMENTS

| 2002/0175335 | A1* | 11/2002 | Lim .................. G02F 1/133555 257/83 |
| 2014/0118674 | A1* | 5/2014 | Izawa ............... G02F 1/133553 349/138 |
| 2018/0143490 | A1 | 5/2018 | Wakabayashi |

FOREIGN PATENT DOCUMENTS

| CN | 102692757 A | 9/2012 |
| CN | 109671719 A | 4/2019 |

(Continued)

OTHER PUBLICATIONS

Written Opinion of the International Search Authority in International application No. PCT/CN2022/130677, mailed on May 5, 2023.

(Continued)

*Primary Examiner* — Jessica M Merlin
(74) *Attorney, Agent, or Firm* — Rivka Friedman (57) ABSTRACT

A display panel and a manufacturing method thereof, and a display device are provided. The display panel includes a backlight module and an array substrate. The array substrate includes an insulation structure is located in the opening region. A first groove is defined at a side of the insulation structure away from the backlight module. A first insulation layer and a second insulation layer are filled in the first groove. The second insulation layer is located on a side of the first insulation layer close to the backlight module, and (Continued)

a refractive index of the second insulation layer is less than a refractive index of the first insulation layer.

20 Claims, 6 Drawing Sheets

(56) References Cited

FOREIGN PATENT DOCUMENTS

| CN | 110610948 A | 12/2019 |
|---|---|---|
| CN | 111834544 A | 10/2020 |
| CN | 111834545 A | 10/2020 |
| CN | 115407570 A | 11/2022 |

OTHER PUBLICATIONS

Chinese Office Action issued in corresponding Chinese Patent Application No. 202211012624.6 dated Jul. 27, 2023, pp. 1-5.

* cited by examiner

DISPLAY PANEL AND MANUFACTURING METHOD THEREOF, AND DISPLAY DEVICE

BACKGROUND OF INVENTION

Field of Invention

The present invention relates to a field of display devices, and specifically to a display panel and a manufacturing method thereof, and a display device.

Description of Prior Art

In recent years, project development for low power consumption, high brightness, and improving light utilization is advancing in thin film transistor liquid crystal displays (TFT-LCDs). Wherein, improving light transmittance rates can improve brightness and reduce power loss of the TFT-LCDs, which is a difficulty that all panel manufacturers in the world are overcoming.

The light transmittance rates of the TFT-LCD panels refer to a ratio of light intensity before and after backlight source passing through the TFT-LCD panels. Under general conditions, the light transmittance rates of the TFT-LCDs only range from 3% to 10%, which means that more than 90% of the light cannot be used.

Regarding opening regions of array substrates of the TFT-LCDs, multi-layer film structures formed of insulating materials, organic materials, transparent conductive materials, and various materials have a great influence on the light efficiency. The multi-layer films in conventional array substrates are all flat structures and have no converging effect on light. In addition, lights emitted from the backlight modules are relatively divergent, and part of the lights does enter non-opening regions from the opening regions, causing loss and waste of the lights, and reducing utilization rate of the lights.

SUMMARY OF INVENTION

One purpose of the invention provides a display panel and a manufacturing method thereof, and a display device to solve the problems of no light converging effect in array substrates and low light utilization rates of the display panel in the prior art.

In order to realize the aforesaid purpose, the present invention provides a display panel. The display panel includes a backlight module and an array substrate. The backlight module has a light-exiting surface. The array substrate is disposed on the light-exiting surface of the backlight module and has a plurality of non-opening regions and a plurality of opening regions.

The array substrate includes an insulation structure. The insulation structure is located in the opening regions. A first groove is defined at a side of the insulation structure away from the backlight module. A first insulation layer and a second insulation layer are filled in the first groove, The second insulation layer is located on a side of the first insulation layer close to the backlight module, and a refractive index of the second insulation layer is less than a refractive index of the first insulation layer.

Furthermore, the insulation substrate includes a substrate layer and a third insulation layer. The third insulation layer is disposed on a side of the substrate layer away from the backlight module. The first groove is defined at a surface of the substrate layer or a third insulation layer away from the backlight module. The second insulation layer is disposed in the first groove, and refractive indexes of the substrate layer and the third insulation layer are both less than the refractive index of the second insulation layer. A second groove is defined at a surface of the second insulation layer away from the backlight module. The first insulation layer is filled in the second groove.

Furthermore, a material of the third insulation layer includes at least one of an organic material or an inorganic material, and a material of the first insulation layer and the second insulation layer includes the inorganic material.

Furthermore, the inorganic material includes silicon oxide, a silicon oxynitride, or silicon nitride. In the first insulation layer, the second insulation layer, and the third insulation layer, the closer a film layer is to the backlight module, the larger a proportion of a number of oxygen atoms in a material of the film layer is, and the farther the film layer is from the backlight module, the larger a proportion of a number of nitrogen atoms in the material of the film layer is.

Furthermore, the first groove is a table-shaped structure, a first included angle is between a lateral wall of the first groove and a bottom surface of the first groove, and an angle of the first included angle ranges from 95° to 135°.

Furthermore, when the second groove is a cone-shaped structure or a table-shaped structure, a second included angle is between a lateral wall of the second groove and the bottom surface of the first groove, and an angle of the second included angle is greater than the first included angle and is less than 180°.

Furthermore, the second groove is at least one of a cone-shaped structure, a table-shaped structure, or a spherical-cap structure; and a central axis of the second groove overlaps with a central axis of the first groove.

Furthermore, depth of the first groove ranges from 0.2 μm to 2 μm, a depth of the second groove is less than or equal to the depth of the first groove, and a depth difference between the first groove and the second groove is less than or equal to 0.5 μm.

Furthermore, the first insulation layer includes a main body portion and a cover portion. The main body portion is filled in the second groove, and a shape of the main body portion matches with a shape of the second groove. The cover portion is disposed on a side of the main body portion away from the backlight module and covers a surface of the substrate layer or the third insulation layer away from the backlight module.

Furthermore, the array substrate further includes a thin film transistor. The thin film transistor is located in the non-opening region, and an orthogonal projection of the thin film transistor on the substrate layer does not overlap with an orthogonal projection of the first groove on the substrate layer.

A manufacturing method of the display panel is further provided by the present invention. The manufacturing method further includes following steps:
  manufacturing a backlight module;
  manufacturing an array substrate, wherein manufacturing the array substrate includes following steps: providing an insulation structure, and defining a non-opening region and an opening region in the insulation structure; forming a first groove at a side of the insulation structure away from the backlight module, wherein the first groove is located in the opening region; and forming a second insulation layer and a first insulation layer are formed in the first groove sequentially.
Wherein, a refractive index of the second insulation layer is less than a refractive index of the first insulation layer.

The present invention further provides a display device. The display device includes the aforesaid display panel.

The advantages of the present invention are that: in the display panel and the manufacturing method thereof in the present invention, a nested insulation structure is formed in the opening region of the array substrate through three adjacent layer film layers, and a double-lens structure is formed in the nested insulation structure; total reflection of a light can be realized, while a light can also be refracted; a light obliquely incident into the non-opening region is reflected back to the opening region, and a divergent light of the backlight in the opening region is converged, thereby reducing a loss rate of the lights in the array substrate and improving display brightness of the display panel.

DESCRIPTION OF DRAWINGS

To more clearly illustrate the technical solutions of the embodiments of the present invention, the accompanying figures of the present invention will be described in brief. Obviously, the accompanying figures described below are only part of the embodiments of the present invention, from which figures those skilled in the art can derive further figures without making any inventive efforts.

The reference numbers of components in the drawings are as follows:
1: display panel;
10: backlight module;
20: array substrate;
30: liquid crystal layer;
40: color filter substrate;
20A: opening region;
20B: non-opening region;
21: thin film transistor;
21: light-shielding layer;
212: active layer;
213: gate electrode layer;
214: source-drain layer;
22: insulation structure;
221: third insulation layer;
222: first groove;
223: second insulation layer;
224: second groove;
225: first insulation layer;
2251: main body portion;
2252: cover portion;
23: substrate layer;
24: buffer layer;
241: first buffer layer;
24: second buffer layer;
251: gate insulation layer;
252: first dielectric layer;
253: second dielectric layer;
26: planarization layer;
27: passivation layer;
28: common electrode layer;
29: pixel electrode layer;
51, 52: photoresist.

DETAILED DESCRIPTION OF EMBODIMENTS

Preferred embodiments of the present invention are described with reference to accompanying figures as follows to prove that the present invention can be implemented. The embodiments of the present invention can be fully described to those skilled in the art to make technical contents clearer and easier to understand. The present invention can be presented in many different forms of embodiments, and the scope of the present invention is not limited to the embodiments set forth herein.

In the accompanying figures, elements with same structures are used same labels to indicate, and components that have similar structure or function are denoted by similar labels. Dimensions and thickness of each component shown in the accompanying figures are arbitrarily shown, and the present invention does not limit the dimensions and thickness of each component. In order to make the accompanying figures be clearer, the thickness of the components is appropriately exaggerated in some places in the accompanying figures.

Besides, the descriptions of embodiments below refer to accompanying drawings in order to illustrate certain invention embodiments which the present invention can implement. Direction terms mentioned in the present invention, for example "upper", "lower", "front", "rear", "left", "right", "inner", "outer", "side", etc. only refer to directions of the accompanying figures. Therefore, the used directional terms are for better and more clearly describing and understanding of the present invention but is not intended to indicate or imply that the indicated devices or elements must have a specific orientation or is constructed and operated in a specific orientation. Therefore, it should not be understood as a limitation on the present invention. In addition, the terms "first", "second", "third", etc. are used for descriptive purposes only and are not to be understood as indicating or implying relative importance.

When a component is described as "on" another component, the component can be placed directly on the other component; there can also be an intermediate component, the component is placed on the intermediate component, and the intermediate component is placed on another component. When a component is described as "mounted" or "connected to" another component, it can be understood as "directly mounted" or "directly connected to", or a component is "mounted" or "connected to" through an intermediate component to another component.

First Embodiment

The embodiment of the present invention provides a display device. The display device can be a liquid crystal display device. The display device includes a display panel 1, and the display panel 1 is configured to present required display images for the display device. The display device can be any display device with a display function, such as a mobile phone, a notebook computer, a tablet computer, etc.

Figure 1:
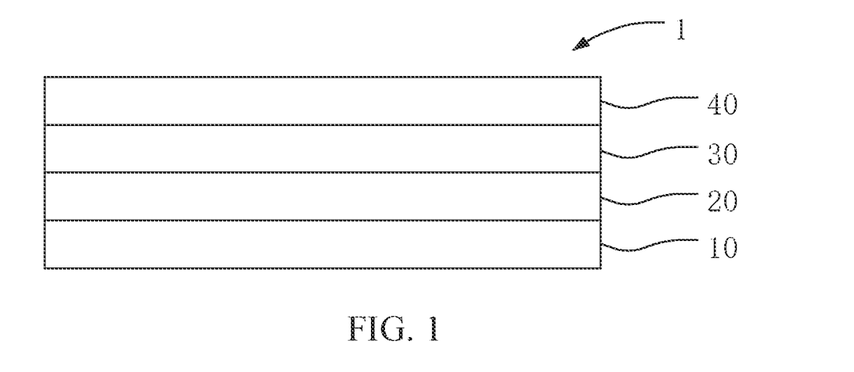
FIG. 1 is a schematic diagram of a layer structure of a display panel in a first embodiment of the present invention.

As illustrated in FIG. 1, the display panel 1 generally includes a backlight module 10, an array substrate 20, a liquid crystal layer 30, and a color filter substrate 40 that are stacked sequentially. The backlight module 10 is configured to provide a display light source for the display panel 1. The array substrate 20 is configured to control a deflection direction of the liquid crystal molecules in the liquid crystal layer 30, so as to control whether a light of a backlight does penetrate or not, thereby forming an image frame. The color filter substrate 40 is configured to filter a light with a single color emitted from the liquid crystal layer 30 into colored lights with various colors, so as to realize color display.

Figure 2:
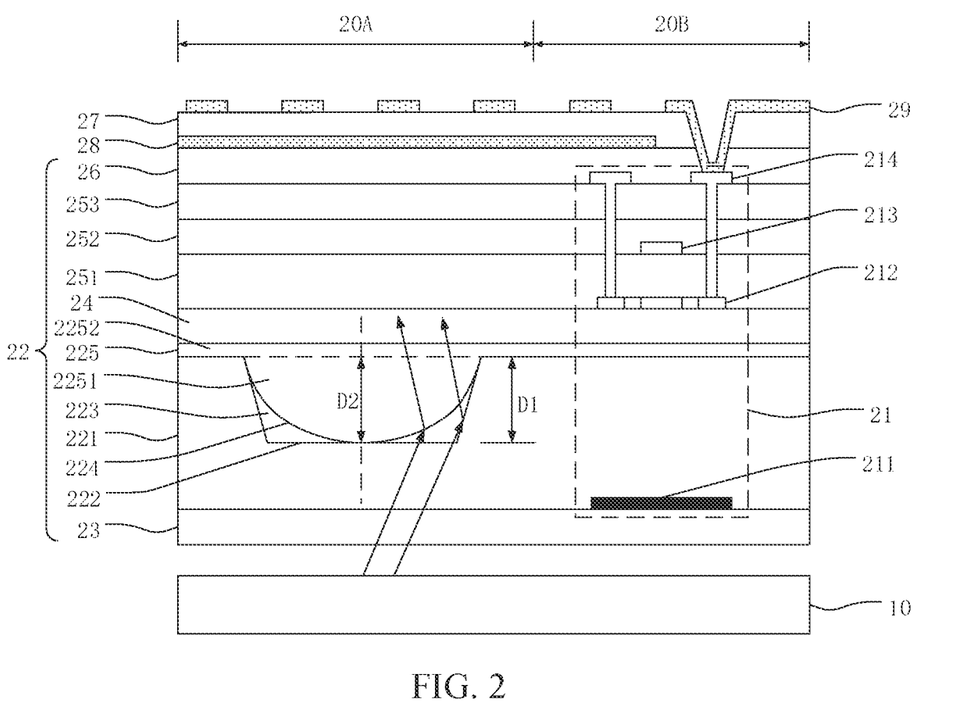
FIG. 2 is a schematic diagram of a layer structure of an array substrate in the first embodiment of the present invention.

As illustrated in FIG. 2, the array substrate 20 is disposed on a light-emitting surface of the backlight module 10, and is provided with a plurality of thin film transistors 21. The thin film transistors 21 are arranged in the array substrate 20 in an array manner. Because light cannot penetrate the thin film transistors 21, a plurality of non-opening regions 20B corresponding to the thin film transistors 21 and opening regions 20A connected to the non-opening regions 20B are formed on the array substrate 20. Wherein, because no thin film transistor 21 is disposed in the opening regions 20A, light can penetrate the opening regions 20A.

The array substrate 20 includes a light-shielding layer 211, an active layer 212, a gate electrode layer 213, and a source-drain layer 214. Wherein, the active layer 212, the gate electrode layer 213, and the source-drain layer 214 are main conductive structures of the thin film transistor 21. The array substrate 20 further includes an insulation structure 22. The insulation structure 22 includes a substrate layer 23, a third insulation layer 221, a second insulation layer 223, a first insulation layer 225, a buffer layer 24, a gate insulation layer 251, a first dielectric layer 252, a second dielectric layer 253, and a planarization layer 26.

The substrate layer 23 is a rigid film layer, such as glass, quartz, etc., which is configured to provide rigid support for the array substrate 20 and improves structural stability of the array substrate 20. The light-shielding layer 211 is disposed on a surface of the substrate layer 23 away from the backlight module 10 and is located in the non-opening region 20B. The light-shielding layer 211 is made of a conductive metal material, which is configured to shield an incident light that enters from a side of the substrate layer 23 from entering into the active layer 212, so as to prevent the light from affecting work of the active layer 212.

The third insulation layer 221 is disposed on the substrate layer 23 and covers the light-shielding layer 211. A plurality of first grooves are defined at a surface of the third insulation layer 211 away from the backlight module 10, and the first grooves 222 are all located in the opening regions 20A, i.e., orthogonal projections of the first grooves 222 and the thin film transistors 21 on the substrate layer 23 do not overlap with each other. Wherein, a depth D1 of the first groove 222 ranges from 0.2 μm to 2 μm, and a thickness of the third insulation layer 221 is greater than the depth D1 of the first groove 222. The first groove 222 is a table-shaped structure, which can be a truncated cone or a quadrangular frusto-pyramidal. Furthermore, a first included angle is between a lateral wall and a bottom surface of the first groove 222, and an angle of the first included angle ranges from 95° to 135°.

The second insulation layer 233 is filled in the first groove 222, and a table-shaped structure that matches with the first groove 222 is formed, making the lateral wall of the second insulation layer 223 to attach to the lateral wall of the first groove 222, i.e., an included angle between the lateral surface and the bottom surface of the second insulation layer 223 also ranges from 95° to 135°. Furthermore, the refractive index of the second insulation layer 233 is greater than a refractive index of the third insulation layer 221.

The third insulation layer 221 and the second insulation layer 223 are assembled to form a prism structure. As illustrated in FIG. 2, the light entering the second insulation layer 223 can pass through the lateral surface of the second insulation layer 223 when it is obliquely incident from the opening region 20A to the non-opening region 20B of the array substrate 20, and a total reflection effect is generated, so that the light obliquely incident on the lateral surface of the second insulation layer 223 is totally reflected. Therefore, the light is prevented from being obliquely incident into the non-opening region 20B, and the obliquely incident light is re-reflected into the opening region 20A, thereby improving the light transmittance rate of the array substrate 20 and reducing light loss.

A second groove 224 is defined at a surface of the second insulation layer 223 away from the backlight module 10. The thickness of the second insulation layer 223 is equal to the depth D1 of the first groove 222, i.e., the surface of the second insulation layer 223 away from the backlight module 10 and a surface of the third insulation layer 221 away from the backlight module 10 are located in a same plane. Therefore, a groove opening of the second groove 224 and a groove opening of the first groove 222 are also in a same plane, and the width of the groove opening of the second groove 224 is less than or equal to a width of the groove opening of the first groove 222. The second groove 224 is a spherical-cap structure, and its depth D2 ranges from 0.2 μm to 2 μm.

Figure 3:
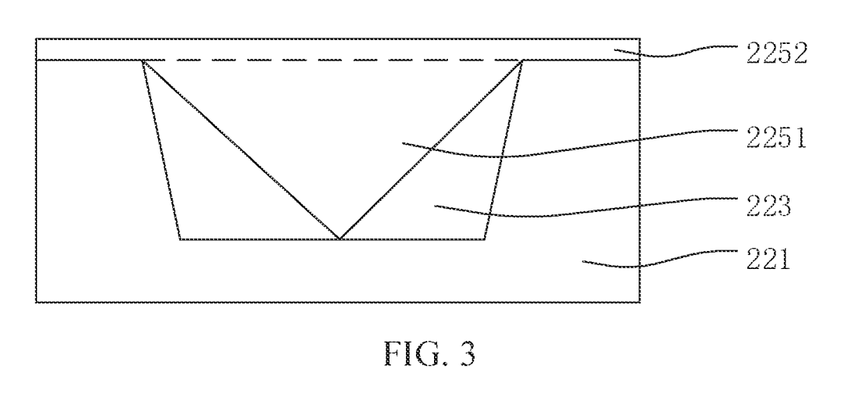
FIG. 3 is a schematic diagram of layers of a cone-shaped second groove in other embodiment of the present invention.
Figure 4:
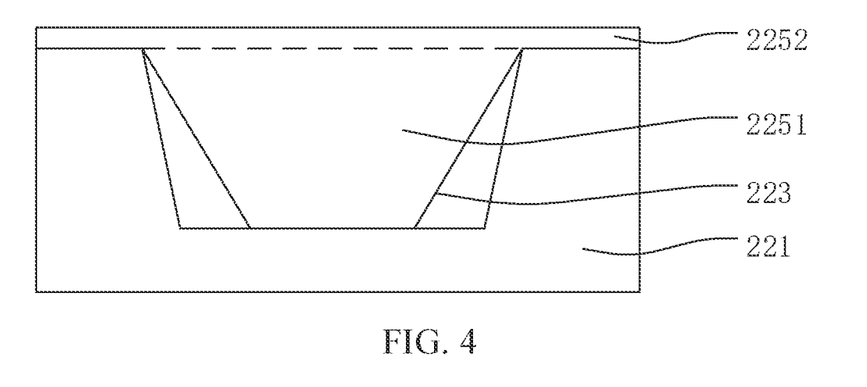
FIG. 4 is a schematic diagram of layers of a table-shaped second groove in other embodiment of the present invention.

In other embodiments of the present invention, the array substrate 20 and the display panel 1 with a cone-shaped second groove 224 as in FIG. 3 or a table-shaped second groove 224 as in FIG. 4 are further provided, their layer structures and manufacturing methods are both similar to the second groove 224 of the spherical-cap structure. Therefore, redundant description will not be mentioned herein again. All other embodiments obtained from those having ordinary skill in the art based on the embodiments of the present application without creative efforts are within the scope of the present application.

Furthermore, when the second groove 224 is a cone-shaped structure or a table-shaped structure, a second included angle is between a lateral wall of the second groove 224 and the bottom surface of the first groove 222, and an angle of the second included angle is greater than the first included angle and is less than 180°.

The first insulation layer 225 is defined on a surface of the substrate layer 23 and the second insulation layer 223 away from the backlight module 10, and it includes a main body portion 2251 and a cover portion 2252. The main body portion 2251 is filled in the second groove 224, and a spherical-cap structure matching with the second groove 224 is formed, making the surface of the main body portion 2251 to attach to an arc-shaped wall surface of the second groove 224. The cover portion 2252 is disposed on a side of the main body portion 2251 away from the backlight module 10 and covers a surface of the substrate layer 23 away from the backlight module 10. Furthermore, the refractive index of the first insulation layer 225 is greater than the refractive index of the second insulation layer 223.

The second insulation layer 223 is assembled with the main body portion 2251 of the first insulation layer 225 to form a converging lens structure. As illustrated in FIG. 2, the light incident from the second insulation layer 223 to the first insulation layer 225 must pass through the arc-shaped surface that the main body portion 2251 attaches to the second insulation layer 223, and a refraction effect is generated, making the light incident on the main body portion 2251 to be refracted, reducing an incident angle of the incident light, thereby converging the divergent light of the backlight, achieving a light-converging effect, and improving the brightness of the display panel 1.

The thickness of the main body portion 2251 is equal to the depth D2 of the second groove 224, i.e., the surface of the main body portion 2251 away from the backlight module 10 and the surface of the third insulation layer 221 away from the backlight module 10 are located in a same plane. Furthermore, a preferred width of a groove opening of the second groove 224 is equal to a width of a groove opening of the first groove 222, i.e., the maximum width of the main body portion 2251 is equal to the maximum width of the second insulation layer 223. Therefore, the width of the main body portion 2251 in the second groove 224 is maximized utmostly, thereby increasing a refractive area of the first insulation layer 225.

Meanwhile, a central axis of the second groove 224 overlaps with a central axis of the first groove 222, making orthogonal projections of the first groove 222 and the second groove 224 to overlap with each other, thus, orthogonal projections of the second insulation layer 223 and the main body portion 2251 also overlap with each other. Therefore, the prism structure formed by the third insulation layer 221 and the second insulation layer 223 is nested with the converging lens structure formed by the second insulation layer 223 and the main body portion 2251 to form a double-lens nested structure, which enhances the light converging effect in the opening region 20A.

The buffer layer 24 is disposed on a surface of the cover portion 2252 away from the substrate layer 23. The buffer layer 24 and the cover portion 2252 can form a buffer structure, which eases an impact force on devices of the display panel 1 during processes of production and transportation, and protects the structure of the thin film transistor 21 in the array substrate 20.

The active layer 212 is disposed on a surface of the buffer layer 24 away from the light-shielding layer 211, and an orthogonal projection of the light-shielding layer 211 on the substrate layer 23 covers an orthogonal projection of the active layer 212 on the substrate layer 23. The gate insulation layer 251 is disposed on the buffer layer 24 and covers the active layer 212. The gate electrode layer 213 is disposed on a surface of the gate insulation layer 251 away from the active layer 212, and an orthogonal projection of the active layer 212 on the substrate layer 23 covers an orthogonal projection of the gate electrode layer 213 on the substrate layer 23. The first dielectric layer 252 is disposed on the gate insulation layer 251 and covers the gate electrode layer 213. The second dielectric layer 253 is disposed on a surface of the first dielectric layer 252 away from the gate electrode layer 213. The source-drain layer 214 is disposed on the second dielectric layer 253, sequentially penetrates through the first dielectric layer 252 and the gate insulation layer 251, and is electrically connected to the active layer 212. The planarization layer 26 is disposed on the second dielectric layer 253 and covers the source-drain layer 214.

Wherein, the thin film transistor 21 generates an electric field by applying a current and voltage to the gate layer 213. The electric field can cause a surface of the active layer 212 to generate induced charges and changes a thickness of a conductive channel, thereby achieving a purpose of controlling a current of the source-drain layer 214 and realizing driving each sub-pixel in the display panel 1. Furthermore, the gate insulation layer 251, the first dielectric layer 252, and the second dielectric layer 253 are configured to insulate and to protect the conductive structures in the thin film transistor 21 to prevent short circuits between wirings. The planarization layer 26 is configured to planarize a surface of the thin film transistor 21.

Specifically, the third insulation layer 221, the second insulation layer 223, the first insulation layer 225, the buffer layer 24, the gate insulation layer 251, the first dielectric layer 252, and the second dielectric layer 253 are made of inorganic materials, and the planarization layer 26 is made of an organic material. Wherein, the inorganic material includes silicon oxide, silicon oxynitride, or silicon nitride. The silicon oxide is adopted in the buffer layer 24, the gate insulation layer 251, the second dielectric layer 253, and the silicon nitride is adopted in the second dielectric layer 253.

In silicon oxide, silicon oxynitride, and silicon nitride, refractive indexes of these material are closely related to proportion ratios of numbers of nitrogen atoms and oxygen atoms. The larger the proportion of the number of the nitrogen atoms is, the higher the refractive index is. The larger the proportion of the number of the oxygen atoms is, the lower the refractive index is. Therefore, in the third insulation layer 221, the second insulation layer 223, and the first insulation layer 225, the closer a film layer is to the backlight module 10, the larger a proportion of oxygen atoms in a material of the film layer is, and the farther the film layer is from the backlight module 10, the larger a proportion of nitrogen atoms in the material of the film layer is.

Furthermore, in the silicon oxide, the silicon oxynitride, and the silicon nitride, the refractive index of the silicon oxide is the lowest, which is about 1.49; the refractive index of silicon oxynitride is in the middle, which is about 1.6-1.7; and the refractive index of silicon nitride is the highest, which is about 1.87. Therefore, the material of the third insulation layer 221 is preferred to be silicon oxide, the material of the second insulation layer 223 is preferred to be silicon oxynitride, and the material of the first insulation layer 225 is preferred to be silicon nitride.

The array substrate 20 further includes a common electrode layer 28, a passivation layer 27, and a pixel electrode layer 29. The common electrode layer 28 is disposed on a surface of the planarization layer 26 away from the source-drain layer 214 and is made of a transparent conductive material. The passivation layer 27 is disposed on the planarization layer 26 and covers the common electrode. The passivation layer 27 is made of silicon nitride and used for passivation and protection of the common electrode layer 28. The pixel electrode layer 29 is disposed on a surface of the passivation layer 27 away from the common electrode layer 28, penetrates through the passivation layer 27 and the planarization layer 26, and is electrically connected to the source-drain layer 214, while electrical insulation is kept between the pixel electrode layer 29 and the common electrode layer 28.

Figure 5:
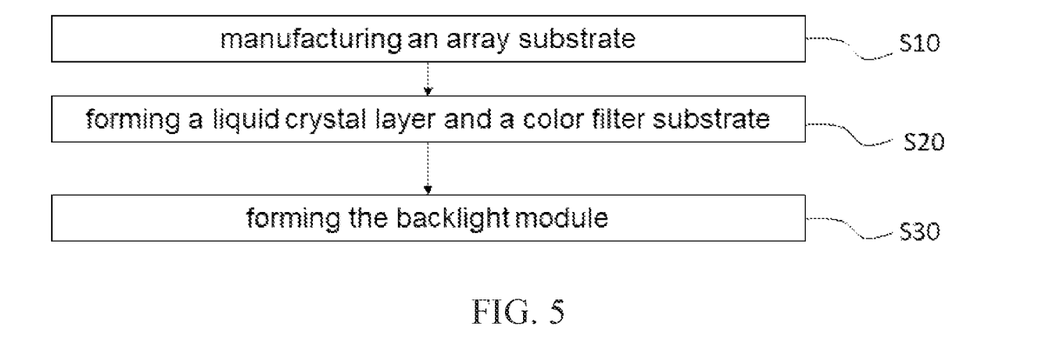
FIG. 5 is a flowchart of a manufacturing method of the display panel in the first embodiment of the present invention.

One embodiment of the present invention further provides a manufacturing method of the display panel 1 to manufacture the aforesaid display panel 1. Manufacturing processes of the manufacturing method of the display panel 1 are illustrated in FIG. 5, which include steps S10 to step S30.

Step S10, manufacturing an array substrate 20:
providing a rigid substrate to act as a substrate layer 23, and defining a plurality of non-opening regions 20B and opening regions 20A connected to the non-opening regions 20B on the substrate layer 23; depositing a layer of a metal material on a surface of the substrate layer 23, and patterning the layer of the metal material to form a light-shielding layer 211 located in the non-opening regions 20B; and depositing a layer of silicon oxide covering the opening regions 20A and the non-opening regions 20B on a surface of the substrate layer 23 to form a first insulation layer 225.

Figure 6:
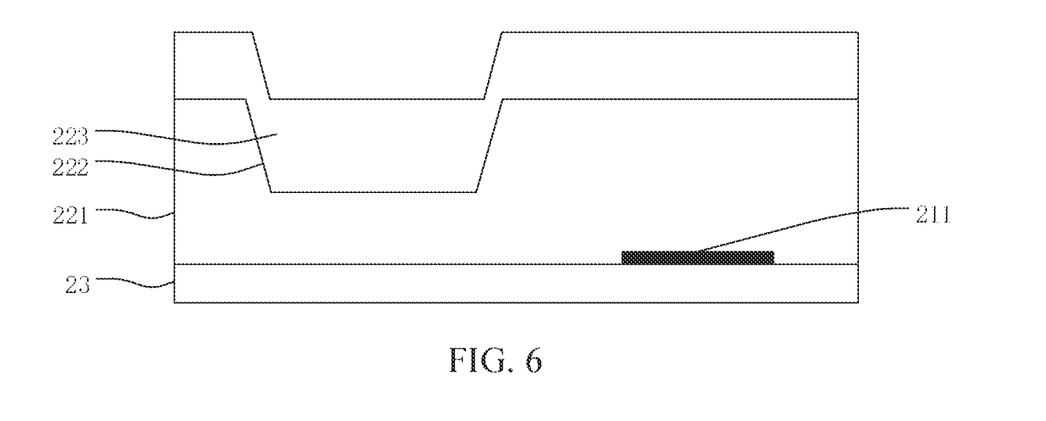
FIG. 6 is a schematic diagram of a layer structure of the array substrate after forming the first groove in the first embodiment of the present invention.

As illustrated in FIG. 6, a first groove 222 is formed in the first insulation layer 225 in the opening regions 20A by processes such as exposure, development, and etching. The first groove 222 is a table-shaped structure, an included angle between a lateral wall and a bottom surface of the first groove 222 ranges from 95° to 135°, and a depth D1 of the first groove 222 ranges from 0.2 μm to 2 μm.

Figure 7:
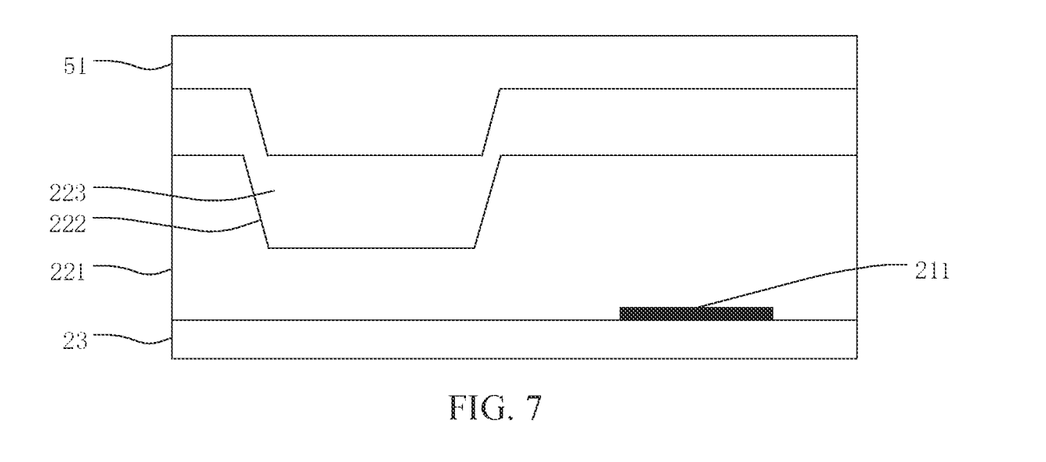
FIG. 7 is a schematic diagram of a layer structure of the array substrate after leveling a surface of a second insulation layer through a photoresist in the first embodiment of the present invention.
Figure 8:
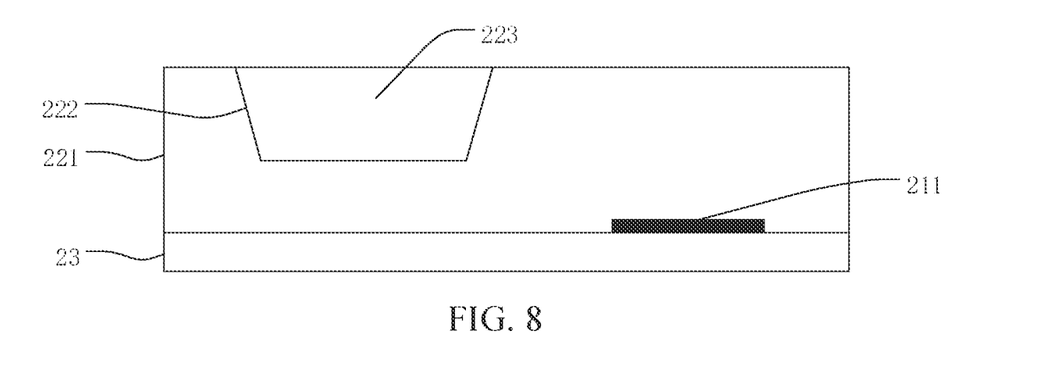
FIG. 8 is a schematic diagram of a layer structure of the array substrate after removing the second insulation layer out of the first groove in the first embodiment of the present invention.

Silicon oxynitride is deposited on a surface of the third insulation layer 221 away from the substrate layer 23. The silicon oxynitride is filled in the first groove 222 and forms a second insulation layer 223. As illustrated in FIG. 7, a layer of photoresist 51 is coated on a surface of the second insulation layer 223 away from the third insulation layer 221, and the surface of the second insulation layer 223 is leveled through the photoresist 51. As illustrated in FIG. 8, entire surfaces of the photoresist 51 and the second insulation layer 223 are dry-etched, and etching rates to the photoresist 51 and the second insulation layer 223 are kept being same, so as to remove the second insulation layer 223 out of the first groove 222, and only the second insulation layer 223 located in the first groove 222 is remained.

Figure 9:
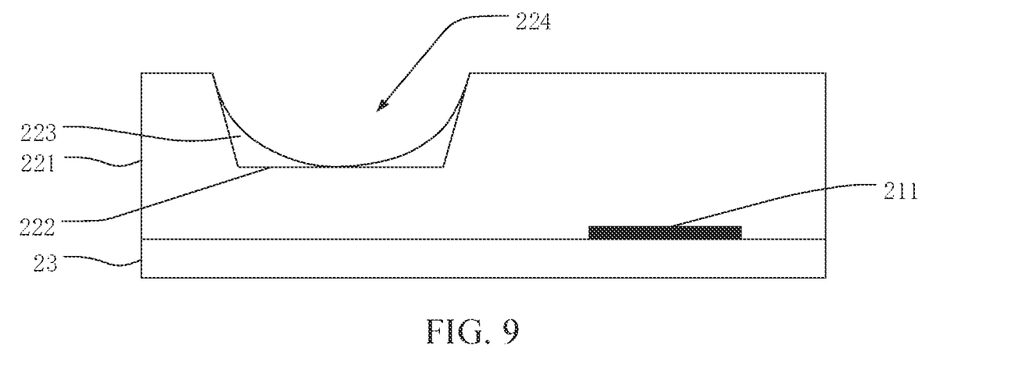
FIG. 9 is a schematic diagram of a layer structure of the array substrate after forming the second groove in the first embodiment of the present invention.

As illustrated in FIG. 9, a second groove 224 is formed in the second insulation layer 223 by processes such as exposure, development, and etching.

The second groove 224 is a spherical-cap structure, and a depth D2 of the second groove 224 ranges from 0.2 μm to 2 μm. Because etching accuracy is difficult to control, a part of the second insulation layer 223 can be remained, making the depth difference between the first groove 222 and the second groove 224 is less than or equal to 0.5 μm. Preferably, the depth D1 of the first groove 222 is greater than the depth D2 of the second groove 224, i.e., the depth difference between the first groove 222 and the second groove 224 is 0.

Figure 10:
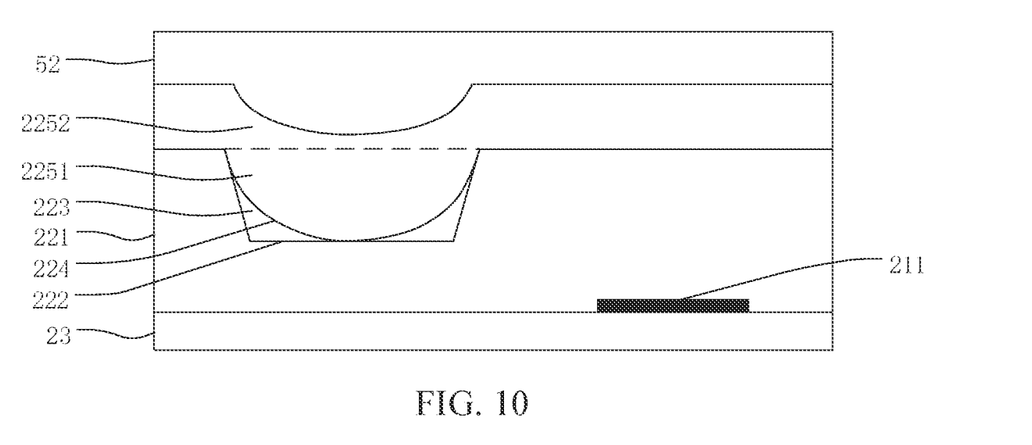
FIG. 10 is a schematic diagram of a layer structure of the array substrate after leveling a surface of a first insulation layer through a photoresist in the first embodiment of the present invention.
Figure 11:
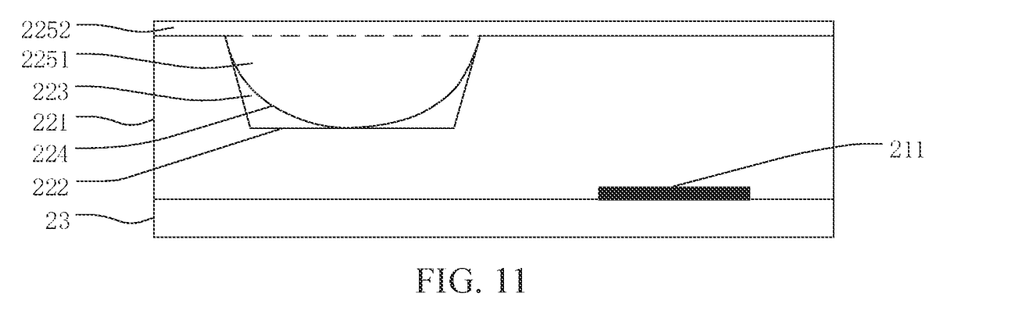
FIG. 11 is a schematic diagram of a layer structure of the array substrate after planarizing the surface of the first insulation layer in the first embodiment of the present invention.

Silicon nitride is deposited on a surface of the third insulation layer 221 away from the second insulation layer 223. The silicon nitride is filled in the second groove 224 and forms the main body portion 2251 and the cover portion 2252 covering the main body portion 2251, and the third insulation layer 221. The main body portion 2251 is assembled with the cover portion 2252 to form the first insulation layer 225. As illustrated in FIG. 10, a layer of photoresist 52 is coated on a surface of the first insulation layer 225 away from the second insulation layer 223, and the surface of the cover portion 2252 is leveled through the photoresist 52. As illustrated in FIG. 11, entire surfaces of the photoresist 52 and the cover portion 2252 are dry-etched, and etching rates of the photoresist 52 and the cover portion 2252 are kept being same, and finally planarization of the surface of the cover portion 2252 is achieved.

The buffer layer 24, the gate insulation layer 251, the first dielectric layer 252, the second dielectric layer 253, the planarization layer 26, and other insulation film layers on the first insulation layer 225, and the conductive structures of the thin film transistor 21 disposed in the aforesaid layer insulation and located in the non-opening region 20B are manufactured by processes of thin film transistors (TFTs).

A layer of a transparent conductive material is deposited on a surface of the planarization layer 26 away from the thin film transistor 21, and the transparent conductive material is patterned to form the common electrode layer 28. A layer of silicon nitride covering the common electrode layer 28 is deposited on the planarization layer 26 to form the passivation layer 27. A layer of a transparent conductive material is deposited on a surface of the passivation layer 27 away from the common electrode layer 28, and the transparent conductive material is patterned to form the pixel electrode layer 29.

Step 20, forming a liquid crystal layer 30 and a color filter substrate 40: forming a liquid crystal cell on a side of the array substrate 20 away from the substrate layer 23, dropping liquid crystals in the liquid crystal cell to form the liquid crystal layer 30; and forming the color filter substrate 40 on a side of the liquid crystal layer 30 away from the array substrate 20.

step S30, forming the backlight module 10: manufacturing the backlight module through backlight processes, and assembling the backlight module 10 on a side of the array substrate 20 away from the liquid crystal layer 30 to form the display panel 1 as illustrated in FIG. 1.

In the embodiments of the present invention, the nested structure with double lenses is formed in the opening region of the array substrate. Furthermore, through the nested structure with double lenses, total reflection and refraction of the light can be realized simultaneously, the light obliquely incident into the non-opening region is reflected back to the opening region, and the divergent light of the backlight in the opening region is converged. Therefore, a loss rate of the lights in the array substrate is reduced, and the light transmittance rate of entire the array substrate is increased, thereby improving display brightness of the display panel.

Second Embodiment

The embodiment of the present invention provides a display panel 1. As illustrated in FIG. 1, the display panel 1 generally includes a backlight module 10, an array substrate 20, a liquid crystal layer 30, and a color filter substrate 40 that are stacked sequentially. The backlight module 10 is configured to provide a display light source for the display panel 1. The array substrate 20 is configured to control a deflection direction of the liquid crystal molecules in the liquid crystal layer 30, so as to control whether a light of a backlight does penetrate or not, thereby forming an image frame. The color filter substrate 40 is configured to filter a light with a single color emitted from the liquid crystal layer 30 into colored lights with various colors, so as to realize color display.

Figure 12:
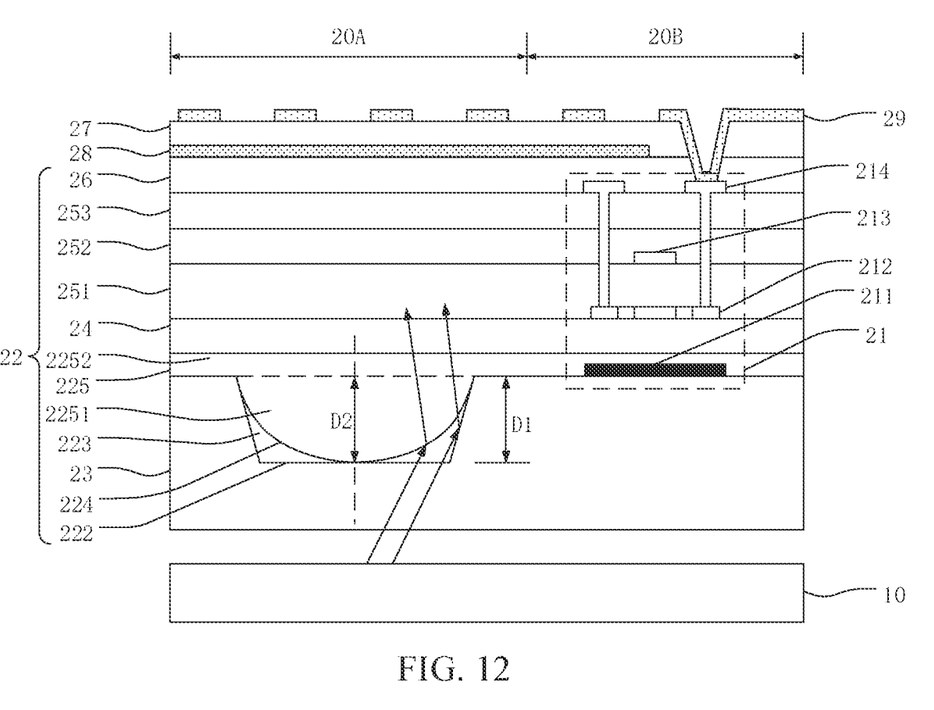
FIG. 12 is a schematic diagram of a layer structure of the array substrate in a second embodiment of the present invention.

As illustrated in FIG. 12, the array substrate 20 is disposed on a light-emitting surface of the backlight module 10, and is provided with a plurality of thin film transistors 21. The thin film transistors 21 are arranged in the array substrate 20 in an array manner. Because light cannot penetrate the thin film transistors 21, a plurality of non-opening regions 20B corresponding to the thin film transistors 21 and opening regions 20A connected to the non-opening regions 20B are formed on the array substrate 20. Wherein, because no thin film transistor 21 is disposed in the opening regions 20A, light can penetrate the opening regions 20A.

The array substrate 20 includes a light-shielding layer 211, an active layer 212, a gate electrode layer 213, and a source-drain layer 214. Wherein, the active layer 212, the gate electrode layer 213, and the source-drain layer 214 are main structures of the thin film transistor 21. The array substrate 20 further includes an insulation structure 22. The insulation structure 22 includes a substrate layer 23, a second insulation layer 223, a first insulation layer 225, a buffer layer 24, a gate insulation layer 251, a first dielectric layer 252, a second dielectric layer 253, and a planarization layer 26.

The substrate layer 23 covers the opening regions 20A and the non-opening regions 20B, a plurality of first grooves 222 are defined at a surface of the substrate layer 23 away from the backlight module 10, and the first grooves 222 are all located in the opening regions 20A, i.e., orthogonal projections of the first grooves 222 and the thin film transistors 21 on the substrate layer 23 do not overlap with each other. Wherein, a depth D1 of the first groove 222 ranges from 0.2 μm to 2 μm, and a thickness of the substrate layer 23 is greater than the depth D1 of the first groove 222. The first groove 222 is a table-shaped structure, which can be a truncated cone or a quadrangular frusto-pyramidal. Furthermore, a first included angle is between a lateral wall and a bottom surface of the first groove 222, and an angle of the first included angle ranges from 95° to 135°. The substrate layer 23 is a glass substrate, and it can also be a glass substrate to provide rigid support for the array substrate 20 to improve structural stability of the array substrate 20.

The light-shielding layer 211 is disposed on a surface of the substrate layer 23 away from the backlight module 10 and is located in the non-opening region 20B. The light-shielding layer 211 is made of a conductive metal material, which is configured to shield an incident light that enters from a side of the substrate layer 23 from entering into the active layer 212, so as to prevent the light from affecting work of the active layer 212.

The second insulation layer 233 is filled in the first groove 222, and a table-shaped structure that matches with the first groove 222 is formed, making the lateral wall of the second insulation layer 223 to attach to the lateral wall of the first groove 222, i.e., an included angle between the lateral surface and the bottom surface of the second insulation layer 223 also ranges from 95° to 135°. Furthermore, a refractive index of the second insulation layer 233 is greater than a refractive index of the substrate layer 23.

The substrate layer 23 and the second insulation layer 223 are assembled to form a prism structure. As illustrated in FIG. 12, the light entering the second insulation layer 223 can pass through the lateral surface of the second insulation layer 223 when it is obliquely incident from the opening region 20A to the non-opening region 20B of the array substrate 20, and a total reflection effect is generated, so that the light obliquely incident on the lateral surface of the second insulation layer 223 is totally reflected. Therefore, the light is prevented from being obliquely incident into the non-opening region 20B, and the obliquely incident light is re-reflected into the opening region 20A, thereby improving the light transmittance rate of the array substrate 20 and reducing light loss.

A second groove 224 is defined at a surface of the second insulation layer 223 away from the backlight module 10. The thickness of the second insulation layer 223 is equal to the depth D1 of the first groove 222, i.e., the surface of the second insulation layer 223 away from the backlight module 10 and a surface of the substrate layer 23 away from the backlight module 10 are located in a same plane. Therefore, a groove opening of the second groove 224 and a groove opening of the first groove 222 are also in a same plane, and the width of the groove opening of the second groove 224 is less than or equal to a width of the groove opening of the first groove 222. The second groove 224 is a spherical-cap structure, and a central axis of the second groove 224 overlaps with a central axis of the first groove 222. A depth D2 of the second groove 224 ranges from 0.2 μm to 2 μm. Because etching accuracy is difficult to control, a depth difference between the first groove 222 and the second groove 224 can be made to be less than or equal to 0.5 μm. Preferably, the depth D1 of the first groove 222 is greater than the depth D2 of the second groove 224, i.e., the depth difference between the first groove 222 and the second groove 224 is 0.

The first insulation layer 225 is defined at a surface of the substrate layer 23 and the second insulation layer 223 away from the backlight module 10, and it includes a main body portion 2251 and a cover portion 2252. The main body portion 2251 is filled in the second groove 224, and a spherical-cap structure matching with the second groove 224 is formed, making the surface of the main body portion 2251 to attach to an arc-shaped wall surface of the second groove 224. The cover portion 2252 is disposed on a side of the main body portion 2251 away from the backlight module 10 and covers a surface of the substrate layer 23 away from the backlight module 10. Furthermore, the refractive index of the first insulation layer 225 is greater than the refractive index of the second insulation layer 223.

The second insulation layer 223 is assembled with the main body portion 2251 of the first insulation layer 225 to form a converging lens structure. As illustrated in FIG. 12, the light incident from the second insulation layer 223 to the first insulation layer 225 must pass through the arc-shaped surface that the main body portion 2251 attaches to the second insulation layer 223, and a refraction effect is generated, making the light incident on the main body portion 2251 to be refracted, reducing an incident angle of the incident light, thereby converging the divergent light of the backlight, achieving a light-converging effect, and improving the brightness of the display panel 1.

The thickness of the main body portion 2251 is equal to the depth D2 of the second groove 224, i.e., the surface of the main body portion 2251 away from the backlight module 10 and the surface of the substrate layer 23 away from the backlight module 10 are located in a same plane. Furthermore, a preferred width of a groove opening of the second groove 224 is equal to a width of a groove opening of the first groove 222, i.e., the maximum width of the main body portion 2251 is equal to the maximum width of the second insulation layer 223. Therefore, the width of the main body portion 2251 in the second groove 224 is maximized utmostly, thereby increasing a refractive area of the first insulation layer 225.

Meanwhile, a central axis of the second groove 224 overlaps with a central axis of the first groove 222, making orthogonal projections of the first groove 222 and the second groove 224 to overlap with each other, thus, orthogonal projections of the second insulation layer 223 and the main body portion 2251 also overlap with each other. Therefore, the prism structure formed by the substrate layer 23 and the second insulation layer 223 is nested with the converging lens structure formed by the second insulation layer 223 and the main body portion 2251 to form a double-lens nested structure, which enhances the light converging effect in the opening region 20A.

The buffer layer 24 is disposed on a surface of the cover portion 2252 away from the substrate layer 23. The buffer layer 24 and the cover portion 2252 can form a buffer structure, which eases an impact force on devices of the display panel 1 during processes of production and transportation, and protects the structure of the thin film transistor 21 in the array substrate 20.

The active layer 212 is disposed on a surface of the buffer layer 24 away from the light-shielding layer 211, and an orthogonal projection of the light-shielding layer 211 on the substrate layer 23 covers an orthogonal projection of the active layer 212 on the substrate layer 23. The gate insulation layer 251 is disposed on the buffer layer 24 and covers the active layer 212. The gate electrode layer 213 is disposed on a surface of the gate insulation layer 251 away from the active layer 212, and an orthogonal projection of the active layer 212 on the substrate layer 23 covers an orthogonal projection of the gate electrode layer 213 on the substrate layer 23. The first dielectric layer 252 is disposed on the gate insulation layer 251 and covers the gate electrode layer 213. The second dielectric layer 253 is disposed on a surface of the first dielectric layer 252 away from the gate electrode layer 213. The source-drain layer 214 is disposed on the second dielectric layer 253, sequentially penetrates through the first dielectric layer 252 and the gate insulation layer 251, and is electrically connected to the active layer 212. The planarization layer 26 is disposed on the second dielectric layer 253 and covers the source-drain layer 214.

Wherein, the thin film transistor 21 generates an electric field by applying a current and voltage to the gate layer 213. The electric field can cause a surface of the active layer 212 to generate induced charges and changes a thickness of a conductive channel, thereby achieving a purpose of controlling a current of the source-drain layer 214 and realizing driving each sub-pixel in the display panel 1. Furthermore, the gate insulation layer 251, the first dielectric layer 252, and the second dielectric layer 253 are configured to insulate and to protect the conductive structures in the thin film transistor 21 to prevent short circuits between wirings. The planarization layer 26 is configured to planarize a surface of the thin film transistor 21.

Specifically, the second insulation layer 223, the first insulation layer 225, the buffer layer 24, the gate insulation layer 251, the first dielectric layer 252, and the second dielectric layer 253 are made of inorganic materials, and the planarization layer 26 is made of an organic material. Wherein, the inorganic material includes silicon oxide, silicon oxynitride, or silicon nitride. The silicon oxide is adopted in the buffer layer 24, the gate insulation layer 251, the second dielectric layer 253, and the silicon nitride is adopted in the second dielectric layer 253.

In silicon oxide, silicon oxynitride, and silicon nitride, refractive indexes of these material are closely related to proportion ratios of numbers of nitrogen atoms and oxygen atoms. The larger the proportion of the number of the nitrogen atoms is, the higher the refractive index is. The larger the proportion of the number of the oxygen atoms is, the lower the refractive index is. Therefore, in the second insulation layer 223 and the first insulation layer 225, the closer a film layer is to the backlight module 10, the larger a proportion of a number of oxygen atoms in a material of the film layer is, and the farther the film layer is from the backlight module 10, the larger a proportion of a number of nitrogen atoms in the material of the film layer is.

Furthermore, in the silicon oxide, the silicon oxynitride, and the silicon nitride, the refractive index of the silicon oxide is the lowest, which is about 1.49; the refractive index of silicon oxynitride is in the middle, which is about 1.6-1.7; and the refractive index of silicon nitride is the highest, which is about 1.87. Furthermore, the refractive index of the substrate layer 23, i.e., glass, is 1.51. Therefore, the material of the second insulation layer 223 is preferred to be silicon oxynitride, and the material of the first insulation layer 225 is preferred to be silicon nitride.

The array substrate 20 further includes a common electrode layer 28, a passivation layer 27, and a pixel electrode layer 29. The common electrode layer 28 is disposed on a surface of the planarization layer 26 away from the source-drain layer 214 and is made of a transparent conductive material. The passivation layer 27 is disposed on the planarization layer 26 and covers the common electrode. The passivation layer 27 is made of silicon nitride and used for passivation and protection of the common electrode layer 28. The pixel electrode layer 29 is disposed on a surface of the passivation layer 27 away from the common electrode layer 28, penetrates through the passivation layer 27 and the planarization layer 26, and is electrically connected to the source-drain layer 214, while electrical insulation is kept between the pixel electrode layer 29 and the common electrode layer 28.

In the embodiments of the present invention, the nested structure with double lenses is formed in the opening region of the array substrate. Furthermore, through the nested structure with double lenses, total reflection and refraction of the light can be realized simultaneously, the light obliquely incident into the non-opening region is reflected back to the opening region, and the divergent light of the backlight in the opening region is converged. Therefore, a loss rate of the lights in the array substrate is reduced, and the light transmittance rate of entire the array substrate is increased, thereby improving display brightness of the display panel.

Moreover, in the embodiments of the present invention, by defining the first groove on the glass substrate, functions of the third insulation layer and the substrate layer in the first embodiment are combined, so that the substrate layer has a rigid support function and can generate the total reflection effect with the second insulation layer. Compared to the first embodiment, a thickness of one inorganic film layer can be further reduced, thereby reducing the overall thicknesses of the array substrate and the display panel.

Third Embodiment

The embodiment of the present invention provides a display panel 1. As illustrated in FIG. 1, the display panel 1 generally includes a backlight module 10, an array substrate 20, a liquid crystal layer 30, and a color filter substrate 40 that are stacked sequentially. The backlight module 10 is configured to provide a display light source for the display panel 1. The array substrate 20 is configured to control a deflection direction of the liquid crystal molecules in the liquid crystal layer 30, so as to control whether a light of a backlight does penetrate or not, thereby forming an image frame. The color filter substrate 40 is configured to filter a light with a single color emitted from the liquid crystal layer 30 into colored lights with various colors, so as to realize color display.

Figure 13:
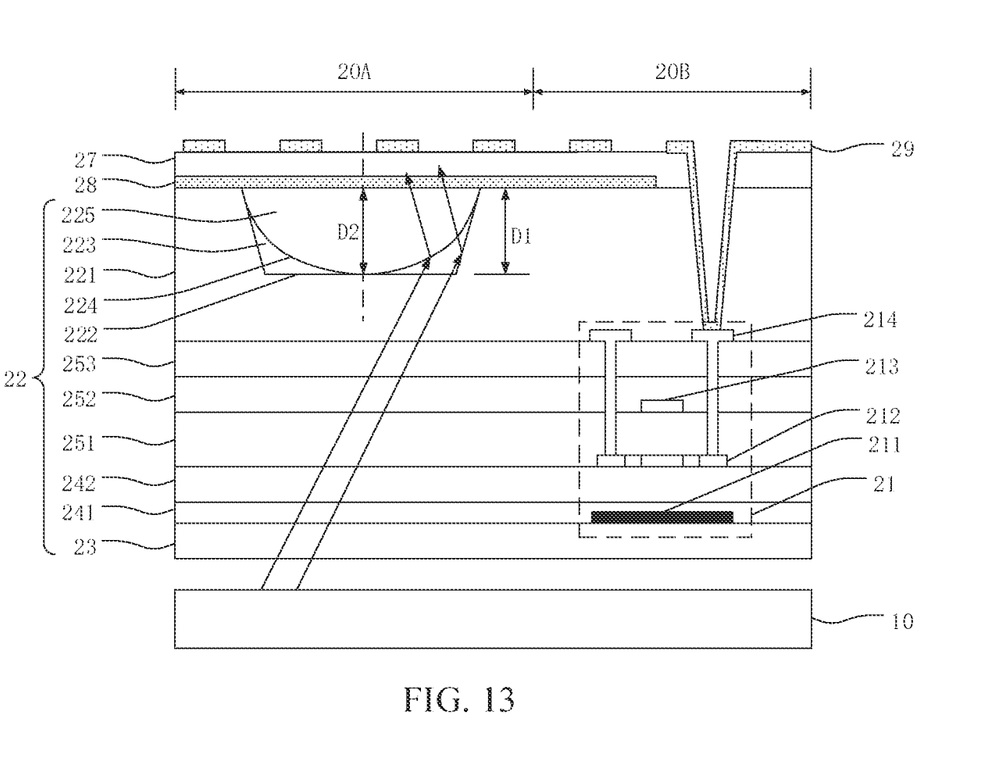
FIG. 13 is a schematic diagram of a layer structure of the array substrate in a third embodiment of the present invention.

As illustrated in FIG. 13, the array substrate 20 is disposed on a light-emitting surface of the backlight module 10, and is provided with a plurality of thin film transistors 21. The thin film transistors 21 are arranged in the array substrate 20 in an array manner. Because light cannot penetrate the thin film transistors 21, a plurality of non-opening regions 20B corresponding to the thin film transistors 21 and opening regions 20A connected to the non-opening regions 20B are formed on the array substrate 20. Wherein, because no thin film transistor 21 is disposed in the opening regions 20A, light can penetrate the opening regions 20A.

The array substrate 20 includes a light-shielding layer 211, an active layer 212, a gate electrode layer 213, and a source-drain layer 214. Wherein, the active layer 212, the gate electrode layer 213, and the source-drain layer 214 are main conductive structures of the thin film transistor 21. The array substrate 20 further includes an insulation structure 22. The insulation structure 22 includes a substrate layer 23, a first buffer layer 241, a second buffer layer 242, a gate insulation layer 251, a first dielectric layer 252, a second dielectric layer 253, a third insulation layer 221, a second insulation layer 223, and a first insulation layer 225.

The substrate layer 23 is a rigid film layer, such as glass, quartz, etc., which is configured to provide rigid support for the array substrate 20 and improves structural stability of the array substrate 20. The light-shielding layer 211 is disposed on a surface of the substrate layer 23 away from the backlight module 10 and is located in the non-opening region 20B. The light-shielding layer 211 is made of a conductive metal material, which is configured to shield an incident light that enters from a side of the substrate layer 23 from entering into the active layer 212, so as to prevent the light from affecting work of the active layer 212.

The first buffer layer 241 is disposed on a surface of the third insulation layer 221 away from the backlight module 10. The second buffer layer 242 is disposed on a surface of the first buffer layer 241 away from the substrate layer 23. The first buffer layer 241 and the second buffer layer 242 can form a buffer structure, which eases an impact force on devices of the display panel 1 during processes of production and transportation, and protects the structure of the thin film transistor 21 in the array substrate 20.

The active layer 212 is disposed on a surface of the second buffer layer 242 away from the light-shielding layer 211, and an orthogonal projection of the light-shielding layer 211 on the substrate layer 23 covers an orthogonal projection of the active layer 212 on the substrate layer 23. The gate insulation layer 251 is disposed on the second buffer layer 242 and covers the active layer 212. The gate electrode layer 213 is disposed on a surface of the gate insulation layer 251 away from the active layer 212, and an orthogonal projection of the active layer 212 on the substrate layer 23 covers an orthogonal projection of the gate electrode layer 213 on the substrate layer 23. The first dielectric layer 252 is disposed on the gate insulation layer 251 and covers the gate electrode layer 213. The second dielectric layer 253 is disposed on a surface of the first dielectric layer 252 away from the gate electrode layer 213. The source-drain layer 214 is disposed on the second dielectric layer 253, sequentially penetrates through the first dielectric layer 252 and the gate insulation layer 251, and is electrically connected to the active layer 212.

The third insulation layer 221 is disposed on the second dielectric layer 253 and covers the source-drain layer 241. A plurality of first grooves are defined at a surface of the third insulation layer 211 away from the backlight module 10, and the first grooves 222 are all located in the opening regions 20A, i.e., orthogonal projections of the first grooves 222 and the thin film transistors 21 on the substrate layer 23 do not overlap with each other. Wherein, a depth D1 of the first groove 222 ranges from 0.2 μm to 2 μm, and a thickness of the third insulation layer 221 is greater than the depth D1 of the first groove 222. The first groove 222 is a table-shaped structure, which can be a truncated cone or a quadrangular frusto-pyramidal. Furthermore, a first included angle is between a lateral wall and a bottom surface of the first groove 222, and an angle of the first included angle ranges from 95° to 135°.

The second insulation layer 233 is filled in the first groove 222, and a table-shaped structure that matches with the first groove 222 is formed, making the lateral wall of the second insulation layer 223 to attach to the lateral wall of the first groove 222, i.e., an included angle between the lateral surface and the bottom surface of the second insulation layer 223 also ranges from 95° to 135°. Furthermore, the refractive index of the second insulation layer 233 is greater than a refractive index of the third insulation layer 221.

The third insulation layer 221 and the second insulation layer 223 are assembled to form a prism structure. As illustrated in FIG. 13, the light entering the second insulation layer 223 can pass through the lateral surface of the second insulation layer 223 when it is obliquely incident from the opening region 20A to the non-opening region 20B of the array substrate 20, and a total reflection effect is generated, so that the light obliquely incident on the lateral surface of the second insulation layer 223 is totally reflected. Therefore, the light is prevented from being obliquely incident into the non-opening region 20B, and the obliquely incident light is re-reflected into the opening region 20A, thereby improving the light transmittance rate of the array substrate 20 and reducing light loss.

A second groove 224 is defined at a surface of the second insulation layer 223 away from the backlight module 10. The thickness of the second insulation layer 223 is equal to the depth D1 of the first groove 222, i.e., the surface of the second insulation layer 223 away from the backlight module 10 and a surface of the third insulation layer 221 away from the backlight module 10 are located in a same plane. Therefore, a groove opening of the second groove 224 and a groove opening of the first groove 222 are also in a same plane, and the width of the groove opening of the second groove 224 is less than or equal to a width of the groove opening of the first groove 222. The second groove 224 is a spherical-cap structure, and a central axis of the second groove 224 overlaps with a central axis of the first groove 222. A depth D2 of the second groove 224 ranges from 0.2 μm to 2 μm. Because etching accuracy is difficult to control, a depth difference between the first groove 222 and the second groove 224 can be made to be less than or equal to 0.5 μm. Preferably, the depth D1 of the first groove 222 is greater than the depth D2 of the second groove 224, i.e., the depth difference between the first groove 222 and the second groove 224 is 0.

The first insulation layer 225 is filled in the second groove 224, and a spherical-cap structure matching with the second groove 224 is formed, making the surface of the first insulation layer 225 to attach to an arc-shaped wall surface of the second groove 224. Furthermore, the refractive index of the first insulation layer 225 is greater than the refractive index of the second insulation layer 223.

The second insulation layer 223 is assembled with the first insulation layer 225 to form a converging lens structure. As illustrated in FIG. 13, the light incident from the second insulation layer 223 to the first insulation layer 225 must pass through the arc-shaped surface that the first insulation layer 225 attaches to the second insulation layer 223, and a refraction effect is generated, making the light incident on the first insulation layer 225 to be refracted, reducing an incident angle of the incident light, thereby converging the divergent light of the backlight, achieving a light-converging effect, and improving the brightness of the display panel 1.

The thickness of the first insulation layer 225 is equal to the depth D2 of the second groove 224, i.e., the surface of the first insulation layer 225 away from the backlight module 10 and a surface of the third insulation layer 221 away from the backlight module 10 are located in a same plane. Furthermore, a preferred width of a groove opening of the second groove 224 is equal to a width of a groove opening of the first groove 222, i.e., the maximum width of the first insulation layer 225 is equal to the maximum width of the second insulation layer 223. Therefore, the width of the first insulation layer 225 in the second groove 224 is maximized utmostly, thereby increasing a refractive area of the first insulation layer 225.

Meanwhile, a central axis of the second groove 224 overlaps with a central axis of the first groove 222, making orthogonal projections of the first groove 222 and the second groove 224 to overlap with each other, thus, orthogonal projections of the second insulation layer 223 and the first insulation layer 225 also overlap with each other. Therefore, the prism structure formed by the third insulation layer 221 and the second insulation layer 223 is nested with the converging lens structure formed by the second insulation layer 223 and the first insulation layer 225 to form a double-lens nested structure, which enhances the light converging effect in the opening region 20A.

Wherein, the thin film transistor 21 generates an electric field by applying a current and voltage to the gate layer 213. The electric field can cause a surface of the active layer 212 to generate induced charges and changes a thickness of a conductive channel, thereby achieving a purpose of controlling a current of the source-drain layer 214 and realizing driving each sub-pixel in the display panel 1. Furthermore, the gate insulation layer 251, the first dielectric layer 252, and the second dielectric layer 253 are configured to insulate and to protect the conductive structures in the thin film transistor 21 to prevent short circuits between wirings. The third insulation layer 221 can also planarize the surface of the array substrate 20 while generating a total reflection effect with the second insulation layer 223.

Specifically, the first buffer layer 241, the second buffer layer 242, the gate insulation layer 251, the first dielectric layer 252, the second dielectric layer 253, the second insulation layer 223, and the first insulation layer 225 are made of inorganic materials, and the third insulation layer 221 is made of an organic material having a leveling effect. Wherein, the inorganic material includes silicon oxide, silicon oxynitride, or silicon nitride. The silicon oxide is adopted in the second buffer layer 242, the gate insulation layer 251, the second dielectric layer 253, and the silicon nitride is adopted in the first buffer layer 241 and the second dielectric layer 253. At least one of polyimide (PI) or polymethylmethacrylate (PMMA) is adopted in the third insulation layer 221.

In silicon oxide, silicon oxynitride, and silicon nitride, refractive indexes of these material are closely related to proportion ratios of numbers of nitrogen atoms and oxygen atoms. The larger the proportion of the number of the nitrogen atoms is, the higher the refractive index is. The larger the proportion of the number of the oxygen atoms is, the lower the refractive index is. Therefore, in the second insulation layer 223 and the first insulation layer 225, the closer a film layer is to the backlight module 10, the larger a proportion of a number of oxygen atoms in a material of the film layer is, and the farther the film layer is from the backlight module 10, the larger a proportion of a number of nitrogen atoms in the material of the film layer is.

Furthermore, in the silicon oxide, the silicon oxynitride, and the silicon nitride, the refractive index of the silicon oxide is the lowest, which is about 1.49; the refractive index of silicon oxynitride is in the middle, which is about 1.6-1.7; and the refractive index of silicon nitride is the highest, which is about 1.87. Furthermore, the refractive index of the third insulation layer 221, i.e., a organic material, is 1.54. Therefore, the material of the second insulation layer 223 is preferred to be silicon oxynitride, and the material of the first insulation layer 225 is preferred to be silicon nitride.

The array substrate 20 further includes a common electrode layer 28, a passivation layer 27, and a pixel electrode layer 29. The common electrode layer 28 is disposed on a surface of the third insulation layer 221 away from the source-drain layer 214 and covers the first insulation layer 225, and the common electrode layer is made of a transparent conductive material. The passivation layer 27 is disposed on the third insulation layer 221 and covers the common electrode. The passivation layer 27 is made of silicon nitride and used for passivation and protection of the common electrode layer 28. The pixel electrode layer 29 is disposed on a surface of the passivation layer 27 away from the common electrode layer 28, penetrates through the passivation layer 27 and the third insulation layer 221, and is electrically connected to the source-drain layer 214, while electrical insulation is kept between the pixel electrode layer 29 and the common electrode layer 28.

In the embodiments of the present invention, the nested structure with double lenses is formed in the opening region of the array substrate. Furthermore, through the nested structure with double lenses, total reflection and refraction of the light can be realized simultaneously, the light obliquely incident into the non-opening region is reflected back to the opening region, and the divergent light of the backlight in the opening region is converged. Therefore, a loss rate of the lights in the array substrate is reduced, and the light transmittance rate of entire the array substrate is increased, thereby improving display brightness of the display panel.

Moreover, in the embodiments of the present invention, by defining the first groove in the organic film layer having the leveling effect, functions of the third insulation layer and the planarization layer in the first embodiment are combined, so that the third insulation layer has a planarization effect and can generate the total reflection effect with the second insulation layer. Compared to the first embodiment, a thickness of one inorganic film layer can be further reduced, thereby reducing the overall thicknesses of the array substrate and the display panel.

Although the present invention is described above with reference to specific embodiments, but it should be noted that these embodiments are merely exemplary of the principles and applications of the present disclosure. Therefore, it should therefore be understood that the exemplary embodiments can be amended in various ways and other designs can also be provided without departure from the spirit and scope of the present invention. It should be understood that different features in the dependent claims and the description can be combined in ways different from those described in the original claims. It can also be understood that a combination of features in one embodiment can be used in other embodiments.

What is claimed is:

1. A display panel, comprising:
a backlight module, having a light-exiting surface; and
an array substrate, disposed on the light-exiting surface of the backlight module, having a plurality of opening regions for passing thought light emitted from the backlight module and a plurality of non-opening regions in addition to the plurality of opening regions, and comprising:
an insulation structure, located in the plurality of opening regions; and
a first groove, defined at a side of the insulation structure facing away from the backlight module, disposed in the opening regions, and filled with insulation materials,
wherein the insulation materials comprise a first insulation layer and a second insulation layer, the second insulation layer is located on a side of the first insulation layer close to the backlight module, and a refractive index of the second insulation layer is less than a refractive index of the first insulation layer.

2. The display panel as claimed in claim 1, wherein the insulation structure comprises:
a substrate layer; and
a third insulation layer disposed on a side of the substrate layer away from the backlight module; and
wherein the first groove is defined at a surface of the substrate layer or a third insulation layer away from the backlight module,
the second insulation layer is disposed in the first groove, refractive indexes of the substrate layer and the third insulation layer are less than the refractive index of the second insulation layer,
a second groove is defined at a surface of the second insulation layer away from the backlight module, and the first insulation layer is filled in the second groove.

3. The display panel as claimed in claim 2, wherein
a material of the third insulation layer comprises at least one of an organic material or an inorganic material, and
a material of the first insulation layer and the second insulation layer comprises the inorganic material.

4. The display panel as claimed in claim 3, wherein
the inorganic material comprises silicon oxide, a silicon oxynitride, or silicon nitride; and
in the first insulation layer, the second insulation layer, and the third insulation layer, the closer a film layer is to the backlight module, the larger a proportion a number of oxygen atoms in a material of the film layer is, and the farther the film layer is from the backlight module, the larger a proportion of a number of nitrogen atoms in the material of the film layer is.

5. The display panel as claimed in claim 2, wherein
the first groove is a table-shaped structure, a first included angle is between a lateral wall of the first groove and a bottom surface of the first groove, and an angle of the first included angle ranges from 95° to 135°.

6. The display panel as claimed in claim 5, wherein
when the second groove is a cone-shaped structure or a table-shaped structure, a second included angle is between a lateral wall of the second groove and the bottom surface of the first groove, and
an angle of the second included angle is greater than the first included angle and is less than 180°.

7. The display panel as claimed in claim 2, wherein
the second groove is at least one of a cone-shaped structure, a table-shaped structure, or a spherical-cap structure; and
a central axis of the second groove overlaps with a central axis of the first groove.

8. The display panel as claimed in claim 2, wherein
a depth of the first groove ranges from 0.2 μm to 2 μm,
a depth of the second groove is less than or equal to the depth of the first groove, and a depth difference between the first groove and the second groove is less than or equal to 0.5 μm.

9. The display panel as claimed in claim 2, wherein the first insulation layer comprises:
a main body portion filled in the second groove, wherein a shape of the main body portion matches with a shape of the second groove; and
a cover portion disposed on a side of the main body portion away from the backlight module and covering a surface of the substrate layer or the third insulation layer away from the backlight module.

10. The display panel as claimed in claim 2, wherein the array substrate comprises:
a thin film transistor located in the plurality on the non-opening regions, wherein an orthogonal projection of the thin film transistor on the substrate layer does not overlap with an orthogonal projection of the first groove on the substrate layer.

11. A manufacturing method of a display panel, comprising following steps:
manufacturing a backlight module; and
manufacturing an array substrate on one side of the backlight module,
wherein manufacturing the array substrate comprises following steps:
providing an insulation structure, and defining an opening region for passing thought light emitted from the backlight module and a non-opening region in addition to the opening region in the insulation structure, wherein the insulation structure comprises a first insulation layer and a second insulation layer;
forming a first groove at a side of the insulation structure away from the backlight module, wherein the first groove is located in the opening region and filled with insulation materials, and the insulation materials comprise the first insulation layer and the second insulation layer; and
forming the second insulation layer and the first insulation layer in the first groove sequentially, wherein a refractive index of the second insulation layer is less than a refractive index of the first insulation layer.

12. A display device, comprising a display panel, wherein the display panel comprises:
a backlight module, having a light-exiting surface; and
an array substrate, disposed on the light-exiting surface of the backlight module, having a plurality of opening regions for passing thought light emitted from the backlight module and a plurality of non-opening regions in addition to the plurality of opening regions, and comprising:

an insulation structure, located in the plurality of opening regions; and a first groove, defined at a side of the insulation structure facing away from the backlight module, disposed in the opening regions, and filled with insulation materials, wherein the insulation materials comprise a first insulation layer and a second insulation layer, the second insulation layer is located on a side of the first insulation layer close to the backlight module, and a refractive index of the second insulation layer is less than a refractive index of the first insulation layer.

13. The display device as claimed in claim 12, wherein the insulation structure comprises:

a substrate layer; and a third insulation layer disposed on a side of the substrate layer away from the backlight module; and wherein the first groove is defined at a surface of the substrate layer or a third insulation layer away from the backlight module, the second insulation layer is disposed in the first groove, refractive indexes of the substrate layer and the third insulation layer are less than the refractive index of the second insulation layer, a second groove is defined at a surface of the second insulation layer away from the backlight module, and the first insulation layer is filled in the second groove.

14. The display device as claimed in claim 13, wherein a material of the third insulation layer comprises at least one of an organic material or an inorganic material, and a material of the first insulation layer and the second insulation layer comprises the inorganic material.

15. The display device as claimed in claim 14, wherein the inorganic material comprises silicon oxide, a silicon oxynitride, or silicon nitride; and in the first insulation layer, the second insulation layer, and the third insulation layer, the closer a film layer is to the backlight module, the larger a proportion a number of oxygen atoms in a material of the film layer is, and the farther the film layer is from the backlight module, the larger a proportion of a number of nitrogen atoms in the material of the film layer is.

16. The display device as claimed in claim 13, wherein the first groove is a table-shaped structure, a first included angle is between a lateral wall of the first groove and a bottom surface of the first groove, and an angle of the first included angle ranges from 95° to 135°.

17. The display device as claimed in claim 16, wherein when the second groove is a cone-shaped structure or a table-shaped structure, a second included angle is between a lateral wall of the second groove and the bottom surface of the first groove, and an angle of the second included angle is greater than the first included angle and is less than 180°.

18. The display device as claimed in claim 13, wherein the second groove is at least one of a cone-shaped structure, a table-shaped structure, or a spherical-cap structure; and a central axis of the second groove overlaps with a central axis of the first groove.

19. The display device as claimed in claim 13, wherein a depth of the first groove ranges from 0.2 µm to 2 µm, a depth of the second groove is less than or equal to the depth of the first groove, and a depth difference between the first groove and the second groove is less than or equal to 0.5 µm.

20. The display device as claimed in claim 13, wherein the first insulation layer comprises:

a main body portion filled in the second groove, wherein a shape of the main body portion matches with a shape of the second groove; and a cover portion disposed on a side of the main body portion away from the backlight module and covering a surface of the substrate layer or the third insulation layer away from the backlight module.

* * * * *